United States Patent

Bauer et al.

[11] Patent Number: 6,116,689
[45] Date of Patent: Sep. 12, 2000

[54] MOTOR VEHICLE SEAT WITH AN UNDERFRAME, WHICH CAN BE ADJUSTED IN HEIGHT AND A BELT LOCK, WHICH IS ATTACHED TO THE SEAT SUPPORT

[76] Inventors: Heinz Bauer, Hammerstr. 9, D-42699 Solingen; Burckhard Becker, Obenkatternberg 25, D-42655 Solingen; Ernst-Reiner Frohnhaus, Hammerstr. 13, D-42699 Solingen, all of Germany

[21] Appl. No.: 09/138,415

[22] Filed: Aug. 24, 1998

[30] Foreign Application Priority Data

Sep. 12, 1997 [DE] Germany ............... 197 40 043

[51] Int. Cl.⁷ .................................. A47C 1/02
[52] U.S. Cl. ........................ 297/344.15; 297/473
[58] Field of Search ............... 297/344.15, 472, 297/473, 480, 471; 280/804, 806, 801.2

[56] References Cited

U.S. PATENT DOCUMENTS

| | | | |
|---|---|---|---|
| 4,790,597 | 12/1988 | Bauer et al. | 297/473 X |
| 4,923,214 | 5/1990 | Seigrist et al. | 297/473 |
| 5,125,611 | 6/1992 | Cox | 297/473 X |
| 5,924,773 | 6/1999 | Kirchhoff et al. | 297/473 |

*Primary Examiner*—Laurie K. Cranmer
*Attorney, Agent, or Firm*—John Lezdey & Assoc.

[57] ABSTRACT

The device relates to a motor vehicle seat with an underframe, which can be adjusted in height, onto which a seat support is arranged and which comprises a back swiveling support, which is linked to the seat support at the swiveling joint and with a belt lock of a safety belt, which is allocated to the seat support. Furthermore, a) at the swiveling support a tooth segment is embodied, which extends to the swiveling joint in a concentric manner that b) the belt lock is linked to the seat support via an L-shaped connecting part, which has a first arm, extending essentially in the direction of the belt lock and a second arm, which extends thereto in a crosswise manner and which is attached to the seat support in a swiveling manner in an articulated joint, which is provided in the distance of the first arm at the second arm and that c) the connecting part comprises an area of contact, which is allocated to the tooth segment and which in its normal position is in distance from the tooth segment via a small clearance, but which can engage at the belt lock into the tooth segment in such a way that it catches the tooth segment, when exposed to stress caused by an accident.

10 Claims, 1 Drawing Sheet

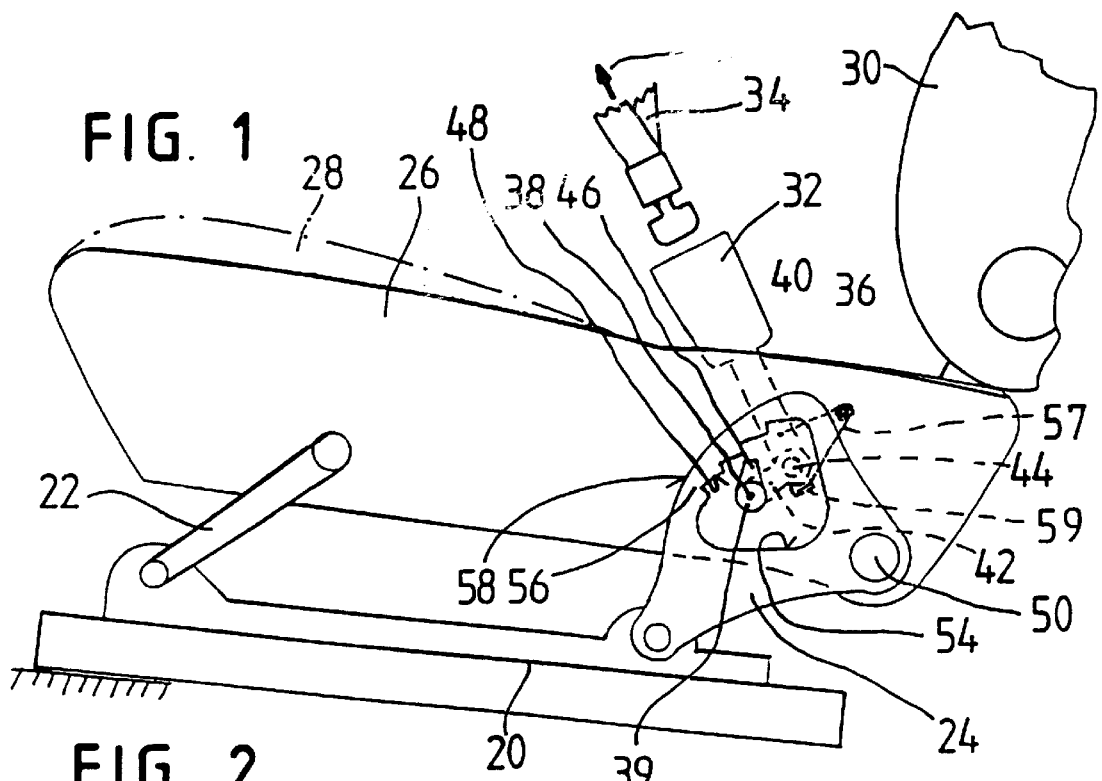
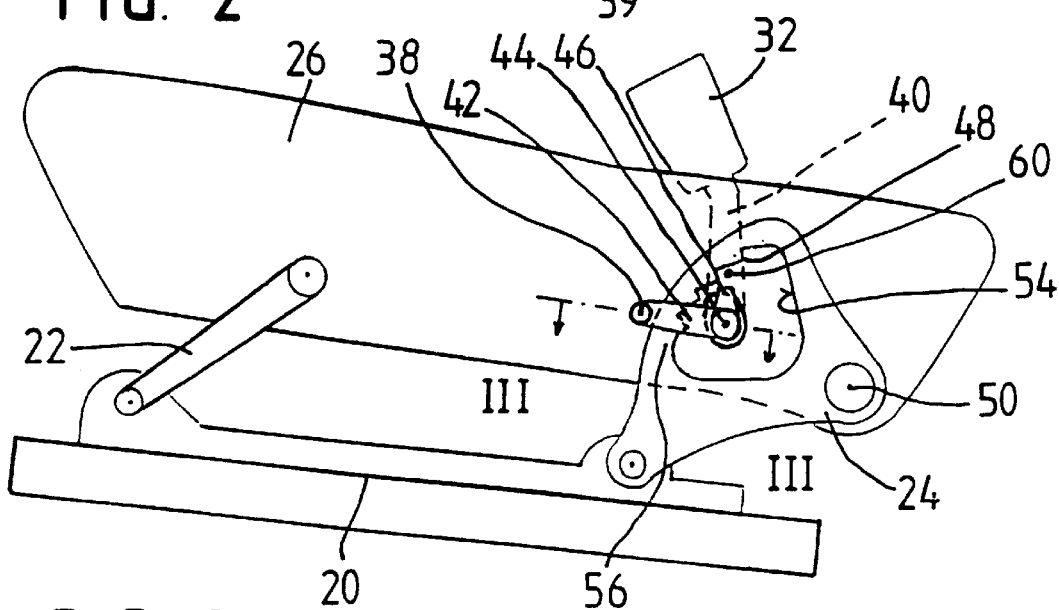
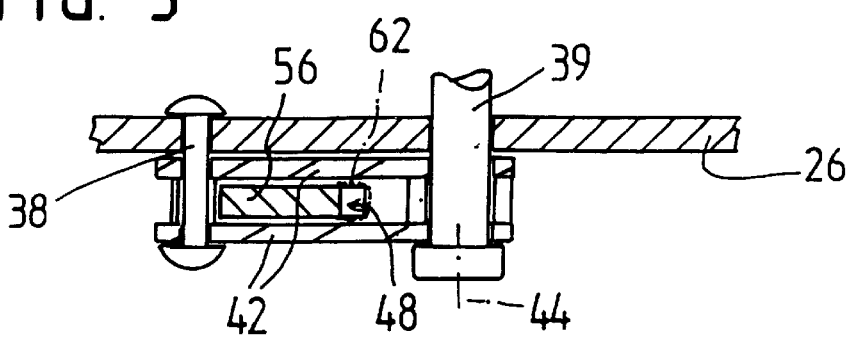

MOTOR VEHICLE SEAT WITH AN UNDERFRAME, WHICH CAN BE ADJUSTED IN HEIGHT AND A BELT LOCK, WHICH IS ATTACHED TO THE SEAT SUPPORT

FIELD OF THE INVENTION

The invention relates to a motor vehicle seat with an underframe, which can be adjusted in height, onto which a seat support is arranged and which comprises a back swiveling support, which is linked to the seat support at the swiveling joint and with a belt lock of a safety belt, which is allocated to the seat support.

BACKGROUND OF THE INVENTION

Such a motor vehicle seat is known from the patent EP 265 747. With this motor vehicle seat a catch arm, which carries a gear tooth forming, and which extends upward in a straight line, is linked to the underframe, especially at a longitudinal adjustment device of the underframe. It is encompassed by a support part onto which the belt lock is attached. The support part can be shifted towards the catch arm. When exposed to an overload due to an accident, the support engages into the gear tooth forming of the catch arm and effects a locking. The support part is linked to the seat support.

This arrangement has proven to be generally effective. It needs a connection to the underframe, however, especially to a seat carrier of the longitudinal adjustment device. This connection is effected by a catch arm. Furthermore, when adjusting the seat carrier towards the underframe, a shifting between the support part and the catch arm occurs each time, the powers effecting this shift always have a component, which extends in a parallel manner to the direction of contact from the support part and the catch arm.

This is where the invention starts. It is the task of the invention to further develop a motor vehicle seat of the above mentioned kind in such a way that an adjustment of the seat support towards the longitudinal adjustment device cannot lead to a contact of the contact area and the gear tooth forming, but rather that a mostly constant clearance and for that reason also a clearance, which can be embodied in a very small manner remains independent of any respective adjustment between the area of contact and the tooth gear forming.

This task is solved by the fact that a) at the swiveling support a tooth segment is embodied, which extends to the swiveling joint in a concentric manner that b) the belt lock is linked to the seat support via an L-shape connecting part, which has a first arm, extending essentially in the direction of the belt lock and a second arm, which extends thereto in a crosswise manner and which is attached to the seat support in a swiveling manner in an articulated joint, which is provided in the distance of the first arm at the second arm that c) the connecting part comprises an area of contact, which is allocated to the tooth segment and which in its normal position is in distance from the tooth segment by a small clearance, but which can engage at the belt lock into the tooth segment in such a way that it catches the tooth segment, when exposed to stress caused by an accident.

With this motor vehicle seat the safety belt tensile forces, which acts upon the belt lock, are induced via the connecting part connected with the same and the area of contact thereof directly into the back support swing, which again guide these forces into the longitudinal adjustment device. A separate part like the catch arm is not necessary according to the state of the art. Due to that, an additional part becomes obsolete, which normally connects the seat support and the longitudinal adjustment device and whose freedom of movement needs to be protected on one hand and guaranteed on the other, which leads to an additional spatial requirement, additional weight and the necessity of random checks.

According to the invention these construction components, which effect an intercrossing caused by an accident and thereby a connection of tensile strength between the belt lock and the back support swing, are explicitly small and arranged exclusively in the area of the seat support. They move with the same. The tooth segment always has the same distance to the area of contact, because the tooth area extends to the swiveling area in a concentric manner and the connecting part is arranged at the seat support with its area of contact. The relative movement and thereby the allocation between area of contact and tooth segment is mechanically more favorable than according to the state of the art, which leads to more defined relations of contact with safety belt tensile forces caused by an accident independent from the relative positions of the individual parts and to construction and function, which can be mechanically better controlled. The contact paths can also be embodied in a shorter manner. The contact may also be reversible even with lower safety belt tensile forces.

It has proven to be advantageous to have a gear tooth forming at the tooth segment embodied in a saw-toothed shape. A decisive factor is the fact that the flanks of the teeth of the tooth segment, which extend crosswise to the direction of the tensile forces and which form the blocking flank when exposed to tensile stress, extend in an angle to the direction to the direction of the tensile force, which is sufficiently large, so that there is no risk of the contact area sliding out of the tooth segment on its own accord.

It has proven to be advantageous to join the first arm and the second arm via a joint. Both arms can basically be connected with each other in a rigid manner. During the process of contact the direction of the first arm does not change with a joint connection.

In a preferred embodiment the tooth segment is embodied on a ring area. This ring area is closely encompassed by an area of contact embodied in an O-shape manner. By this the area of contact is allocated in such a way that it offers extensive security and that it is opened only after the destruction of at least one part. An evasion to the side of the area of contact during the phase of stress and thereby a release of the area of contact from the tooth segment is avoided that way.

In a preferred embodiment the connecting part is kept in its normal position by a spring. The spring is embodied sufficiently weak that it has no effect on the safety belt lock with tensile forces caused by an accident. It is much rather embodied in an advantageous manner in such a way that it is overcome already with a light car accident and thereby the area of contact can engage into the teeth of the tooth segment. By this, this contact can occur already with a delay of 3 g (1 g corresponding to 10 m s$^{-2}$). Typical accelerations caused by an accident are at –10 g and above.

It is also possible to arrange the connecting part, which is destroyed when overexposed to stress caused by an accident, by a support part to the seat support and thereby to keep it in the normal position. That way for example, the connecting part can be connected to the seat support via a pin, which shears off when exposed to stress caused by an accident.

The construction of the motor vehicle seat according to the invention makes it possible to adjust the safety belt lock in dependence of the angular position of the back swiveling support in a different way with regard to the seat support. The relative movement between the tooth segment (and thereby swiveling support) and the connecting part, as it may appear when adjusting the angle inclination of the back swiveling support, can actually be influenced for an influence of the angular position of the belt lock via a more or less strong receiver of the first arm by the swiveling support.

In a preferred embodiment a) a lower articulated area of the swiveling support at a longitudinal adjustment device, b) the area of contact and c) the belt lock lay essentially above each other or in the direction of the tensile forces, which act upon at the safety belt lock. That way the high safety belt forces caused by an accident are induced favorably into the longitudinal adjustment device and thereby also into the understructure of the pertaining motor vehicle. It has proven to be advantageous, if the two mentioned areas and the safety belt lock are essentially on a straight line. In the course of the adjustment area of the back swiveling support these conditions already mentioned are more or less fulfilled.

Further advantages and characteristics of the invention derive from the other claims as well as the following description of a non-restrictive embodiment of the invention, which is illustrated further with regard to the drawing. This drawing shows in:

BRIEF DESCRIPTION OF THE DRAWINGS

FIG. 1: a side view of a motor vehicle seat in a principal illustration,

FIG. 2: a side view similar to FIG. 1 for another embodiment and

FIG. 3: a cross-sectional view along the intersection line III—III in FIG. 2.

DESCRIPTION OF THE PREFERRED EMBODIMENTS

FIG. 1 illustrates a motor vehicle seat with an underframe which can be adjusted in height. It is developed by a longitudinal adjustment device 20 with two pairs of longish carriers, which can be shifted and adjustably locked against each other, by front swiveling supports 22, which are joined in a hinge connection with the same and by back swiveling supports 24, which are joined in a hinge connection correspondingly with the longitudinal adjustment device 20. As usual, also respectively two of the swiveling supports exist, actually one time for the left and one time for the right side of the seat. At their upper, free end the swiveling supports 22, 24 are linked to a seat support 26. It carries a seat cushion 28, which is not illustrated further here and a back rest 30, which is only indicated, which can be adjusted with regard to the angle towards the seat support 26.

A safety belt lock 32 of a safety belt is allocated to the seat support 26. The safety belt lock 32 is linked to the seat support 26 via a connecting part 34, the link occurs in an articulated joint 38. The connecting part is essentially L-shaped, it has a first arm 40 and a second arm 42, which extend crosswise towards each other. The articulated joint is provided at the second arm, namely at the free end thereof and in distance to the first arm.

In the embodiment according to FIG. 1 the first arm 40 and the second arm 42 are linked together via a joint 44. An area of contact 46 is rigidly connected to the second arm via a shaft 39, which belongs to the articulated joint 38, at least equiaxed thereto. The area of contact is embodied as a locking cam in the illustrated embodiment.

The back swiveling support 24 embodies a tooth gear 48, which extends in a concentric manner to the swiveling axis of the back swiveling support 24. This tooth gear extends across an angle, which essentially corresponds to the maximum swiveling angle between the back swiveling support 24 and the seat support 26 around the swiveling joint 50.

The area of contact 46 is as close as possible to the tooth segment 48. It is separated from it by a small clearance, which is only a few millimeters large and which may be 1 to 3 mm for example. By this, in the normal position as illustrated in FIG. 1, the tooth segment 48 can be swiveled without reciprocal action with the area of contact 46 towards the area of contact 46, if an adjustment of the underframe occurs. A turning by several degrees, for example 5 to 10 degrees, of the area of contact 46 around the shaft 36, which connects it with the second arm 42 in a rigid manner, is sufficient however, to have it engage into the tooth segment 48. Then the area of contact 46 is caught in the tooth segment 48 and a further relative movement of both parts towards each other is avoided.

The operations explained just now occur, if a sufficiently high tractive power acts upon the safety belt lock 32, especially a tensile force on the safety belt caused by an accident. The arrow 52 is supposed to illustrate such a safety belt tensile force. If the safety belt lock 32 is pulled up in its direction, the joint 44, which is connected with the safety belt lock via the first arm 40, follows and by this the angle between the first arm 40 and the second arm 42 changes. The angle gets larger. The second arm swivels around the articulated joint 38 in the illustration according to FIG. 1 in a mathematically positive sense, thereby the area of contact 46 swivels in the area of the tip circle of the teeth of the tooth segment 48 and thereby in contact with the teeth. The described movement comes to a standstill by the fact that the area of contact 46 catches the teeth of the tooth segment completely.

The articulated joint 38 and especially the shaft 39, which connects the actual second arm 42 with its area of contact 46, is positioned within a recess 54 of the back swiveling support 24. By this, a complete release of the safety belt lock 32 is prevented even with a misplaced contact. The tooth segment 48 embodies an inner margin of the recess 54. The tooth segment 48 is positioned on a ring area 56. It is possible and even intended to equip the exterior circle standing in a concentric manner to the tooth segment 48 with teeth and to provide a pinion at this point, via which the angular adjustment of the back swiveling support 24 can be operated.

In FIG. 1 the safety belt lock 32 is kept in the illustrated normal position in co-operation with a stop device 59 via an elastic part 57, which is embodied here as a leg spring 57. This spring 57 pushes the first arm 40 in the opposite direction to the force arrow 52 towards the bottom against the stop. The leg spring 57 encompasses a bolt, which projects from the seat support 26, with one arm it supports itself at the stop 59 with the other arm it engages into a hole of the first arm 40 and takes the same with it.

In the embodiment according to the FIGS. 2 and 3 a back swiveling support 24 of practically the same construction is used, but the articulated joint 38 is now positioned outside the recess 54 of this swiveling support 24. It is provided in direct vicinity of the exterior circle 58. The second arm 42 encompasses the ring area 56, thereby achieving an improved allocation of the area of contact 46 and the tooth segment 48. FIG. 3 illustrates this arrangement.

The area of contact 46 is embodied as a locking cam again, other embodiments, for example in the shape of a tooth segment and so forth are possible. It is now arranged at the joint 44 between the first and the second arm 40, 42 and has two individual contacts, which are slightly angularity displaced against each other.

At the first arm 40 a shearing pin 60 is provided, which engages into a hole, which is embodied in the seat support 26. By this, the first arm 40 is additionally fixed for the positioning thereof via the second arm 42, that the safety belt lock 32 keeps the position, which is illustrated in FIG. 2. The shearing pin 60 is destroyed with an overload caused by an accident. It is made of plastic for example. A protective covering 62 can also be provided, for example at the tooth segment 48, it will be destroyed when exposed to overload.

In the embodiment according to the FIGS. 2 and 3 it is possible to also embody the exterior circle 58 with teeth. This gear tooth forming can not only be provided for the pinion, already mentioned earlier, of an adjustment device for the back swiveling support 24, but as an alternative or in addition as a second tooth segment, onto which a further area of contact which is similar to the one according to FIG. 1 is allocated at the articulated joint. That way a contact on both sides is possible.

If in the embodiments, the back swiveling support 24 is always illustrated in one piece, this is basically not necessary for the construction. It is also possible, that the back swiveling support is constructed of several components, for example of an actual support similar to the front swiveling support 22 and an additional part, which embodies the tooth segment 48.

What is claimed is:

1. In a motor vehicle seat with an underframe, which can be adjusted in height, onto which a seat support is arranged and which comprises a back swiveling support which is linked to the seat support at the swiveling joint and with a belt lock of a safety belt, which is allocated to the seat support, the improvement which comprises that (a) at the swiveling support a tooth segment is embodied, which is concentric to the swiveling joint axis of the back swiveling support (b) the belt lock is linked to the seat support via a L-shaped connecting part, which has a first arm, extending essentially in the direction of the belt lock and a second arm, which extends thereto in a crosswise manner and which is attached to the seat support in a swiveling manner in an articulated joint, at a free end of the second arm, and at a distance from the first arm and that (c) the connecting part comprises an area of contact, which in its normal position is at a distance from the tooth segment via a small clearance, but which can engage into the tooth segment in such a way that it catches the tooth segment, when the belt lock is exposed to tensile forces caused by an accident.

2. The motor vehicle seat according to claim 1 wherein said first arm and said second arm are connected with each other via a joint.

3. The motor vehicle seat according to claim 1 wherein said tooth segment is embodied at a ring area and that this ring area encircles the second arm in an O-shape manner.

4. The motor vehicle seat according to claim 1 wherein said area of contact is arranged at the second arm.

5. The motor vehicle seat according to claim 4 wherein said area of contact is connected in a rigid manner with the second arm or with a shaft.

6. The motor vehicle seat according to claim 1 wherein said connecting part is biased in an elastic manner into the normal position by a spring.

7. The motor vehicle seat according to claim 1 wherein said connecting part is kept in its normal position by a supporting part which is destroyed when exposed to an overload caused by an accident.

8. The motor vehicle seat according to claim 1 which comprises a lower coupling area of the swiveling support at a longitudinal adjustment device, b) the area of contact and c) the belt lock are above each other and/or mostly in a straight line in the direction of the tensile forces.

9. A motor vehicle seat with an underframe, which can be adjusted in height, onto which a seat support is arranged, which comprises a back swiveling support, which is linked to the seat support at a swiveling joint, and with a belt lock of a safety belt, which is allocated to the seat support, said swiveling support having a tooth segment, which is concentric to said swiveling axis of the back swiveling support and a belt lock which is linked to the seat support via an L-shaped connecting part, said L-shaped part consisting of a first arm, extending essentially in the direction of the belt lock and a second arm, which extends thereto in a crosswise manner and which is attached to said seat support in a swiveling manner in an articulated joint which is provided at the free end of the second arm at a distance from the first arm, said connecting part further comprises an area of contact, which in its normal position is at a distance from said tooth segment via a small clearance, but which can engage into said tooth segment in such a way that it catches the tooth segment when the belt lock is exposed to tensile forces stress caused by an accident.

10. In a motor vehicle seat with an underframe, which can be adjusted in height onto which a seat support is arranged and which comprises a back swiveling support which is linked to the seat support at a swiveling joint and with a belt lock of a safety belt which is connected to the seat support, the improvement which comprises that a) at the swiveling support a tooth segment is embodied, which extends to the swiveling joint in a concentric manner that (b) the belt lock is linked to the seat support via an L-shaped connecting part, which has a first arm, extending essentially in the direction of the belt lock and a second arm, which extends thereto in a crosswise manner and which is attached to the seat support in a swiveling manner in an articulated joint, which is provided at a distance from the first arm at the second arm and that (c) the L-shaped connecting part comprises an area of contact, which in its normal position is at a distance from the tooth segment via a small clearance, but which can engage at the belt lock into the tooth segment in such a way that it catches the tooth segment when exposed to tensile forces caused by an accident, wherein said area of contact and said tooth segment are covered by a protective covering, which is destructible, and which prevents an engagement of the area of contact into the tooth segment with normal safety belt tensile forces, and which protective covering is destroyed with safety belt tensile forces caused by an accident, so that an engagement is possible.

\* \* \* \* \*